US009357115B2

(12) United States Patent
Campbell et al.

(10) Patent No.: US 9,357,115 B2
(45) Date of Patent: *May 31, 2016

(54) CAMERA MOUNTING ASSEMBLY

(71) Applicant: GoPro, Inc., San Mateo, CA (US)

(72) Inventors: Scott Patrick Campbell, Belmont, CA (US); Michael Zaven Demerjian, Pacifica, CA (US); Rudy Lucas Samuels, Mill Valley, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,310

(22) Filed: Oct. 29, 2015

(65) Prior Publication Data

US 2016/0072988 A1 Mar. 10, 2016

Related U.S. Application Data

(63) Continuation of application No. 14/604,118, filed on Jan. 23, 2015, now Pat. No. 9,204,022, which is a continuation of application No. 13/666,807, filed on Nov. 1, 2012, now Pat. No. 8,970,689.

(60) Provisional application No. 61/554,925, filed on Nov. 2, 2011.

(51) Int. Cl.
*H04N 5/225* (2006.01)
*G03B 17/08* (2006.01)
*G03B 17/56* (2006.01)

(52) U.S. Cl.
CPC .............. *H04N 5/2252* (2013.01); *G03B 17/08* (2013.01); *G03B 17/561* (2013.01); *H04N 5/2253* (2013.01); *H04N 5/2254* (2013.01)

(58) Field of Classification Search
CPC . H04N 5/2251; H04N 5/2252; H04N 5/2254; G02B 7/00; G02B 7/02; G02B 13/0055
See application file for complete search history.

(56) References Cited

U.S. PATENT DOCUMENTS

| D219,768 | S | 1/1971 | Conwill |
| D243,655 | S | 3/1977 | Matousek et al. |
| D272,392 | S | 1/1984 | Bigelow |
| D418,044 | S | 12/1999 | Schoeneweis |
| 6,104,887 | A | 8/2000 | Hamasaki et al. |

(Continued)

FOREIGN PATENT DOCUMENTS

DE 202005004068 U1 7/2005

OTHER PUBLICATIONS

PCT International Search Report and Written Opinion, PCT/US2012/063304, Jan. 22, 2013, 7 Pages.

(Continued)

*Primary Examiner* — Timothy J Henn
(74) *Attorney, Agent, or Firm* — Fenwick & West LLP

(57) ABSTRACT

A camera mounting assembly is configured to couple to a camera housing. The camera mounting assembly includes a plurality of indentations configured to allow for the passage of light through the indentations and upon the image sensor of a camera enclosed by the camera housing. The camera mounting assembly can further include recessed channels within an inner-front surface of the camera mounting assembly configured to further allow for the passage of light through the indentations, through the recessed channels, and upon the image sensor.

20 Claims, 13 Drawing Sheets

(56) References Cited

U.S. PATENT DOCUMENTS

| | | |
|---|---|---|
| D437,772 S | 2/2001 | Erwin |
| D483,789 S | 12/2003 | Dordick |
| D511,960 S | 11/2005 | Ogino |
| D515,910 S | 2/2006 | Gates |
| 7,285,879 B2 | 10/2007 | Osaka |
| D559,083 S | 1/2008 | Brassard |
| D571,188 S | 6/2008 | Brassard |
| D591,325 S | 4/2009 | Dordick |
| D625,750 S | 10/2010 | Dittmer |
| D640,304 S | 6/2011 | Green et al. |
| D675,242 S | 1/2013 | O'Donnell et al. |
| 8,970,689 B2 * | 3/2015 | Campbell ............ H04N 5/2252 348/335 |
| 9,204,022 B2 * | 12/2015 | Campbell ............ H04N 5/2252 |
| 2006/0007551 A1 | 1/2006 | Sakurai et al. |
| 2007/0268588 A1 | 11/2007 | Elias et al. |
| 2009/0059064 A1 * | 3/2009 | Terakado ............. H04N 5/2251 348/376 |
| 2010/0060747 A1 | 3/2010 | Woodman |
| 2010/0253832 A1 * | 10/2010 | Duparre ........... H01L 27/14618 348/360 |
| 2010/0266273 A1 * | 10/2010 | Wood .................... G03B 11/00 396/544 |
| 2012/0242785 A1 | 9/2012 | Sasagawa et al. |
| 2012/0242786 A1 | 9/2012 | Sasagawa et al. |

OTHER PUBLICATIONS

United States Office Action for U.S. Appl. No. 13/666,807, Oct. 6, 2014, 11 pages.
United States Office Action for U.S. Appl. No. 14/604,118, Apr. 14, 2015, 11 pages.

* cited by examiner

CAMERA MOUNTING ASSEMBLY

CROSS REFERENCE TO RELATED APPLICATIONS

This application is a continuation of U.S. application Ser. No. 14/604,118, filed Jan. 23, 2015, now U.S. Pat. No. 9,204,022, which application is a continuation of U.S. application Ser. No. 13/666,807, filed Nov. 1, 2012, now U.S. Pat. No. 8,970,689, which claims the benefit of U.S. Provisional Application No. 61/554,925, filed Nov. 2, 2011, all of which are incorporated herein by reference in their entirety.

TECHNICAL FIELD

This disclosure relates to camera mounting assemblies, and more specifically, to a camera mounting assembly configured to maximize light received by an image sensor.

DESCRIPTION OF RELATED ART

Digital camera technology has advanced in recent years. Cameras have become cheaper to make and purchase, buoying camera ownership among consumers. As consumers become used to better and more advanced camera technology, the expectations of image quality among consumers has increased. Minor image imperfections that were previously overlooked by consumers are becoming increasingly noticed, and the demand for even higher quality image capture has increased accordingly.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1A illustrates a perspective view of a camera mounting assembly, according to one embodiment.

DETAILED DESCRIPTION

Figure 1A:
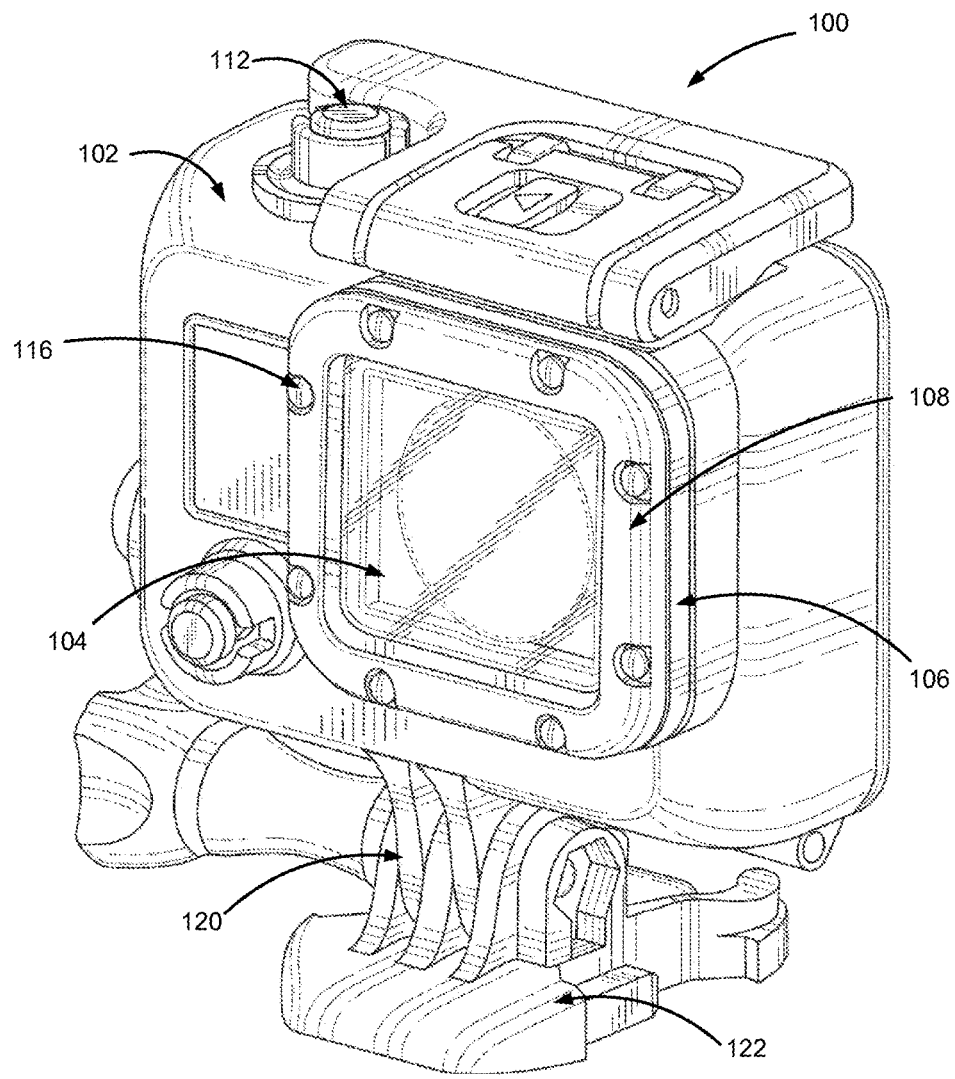
FIG. 1B illustrates an additional perspective view of a camera mounting assembly, according to one embodiment.
FIG. 1C illustrates an additional perspective view of a camera mounting assembly, according to one embodiment.
Figure 1B:
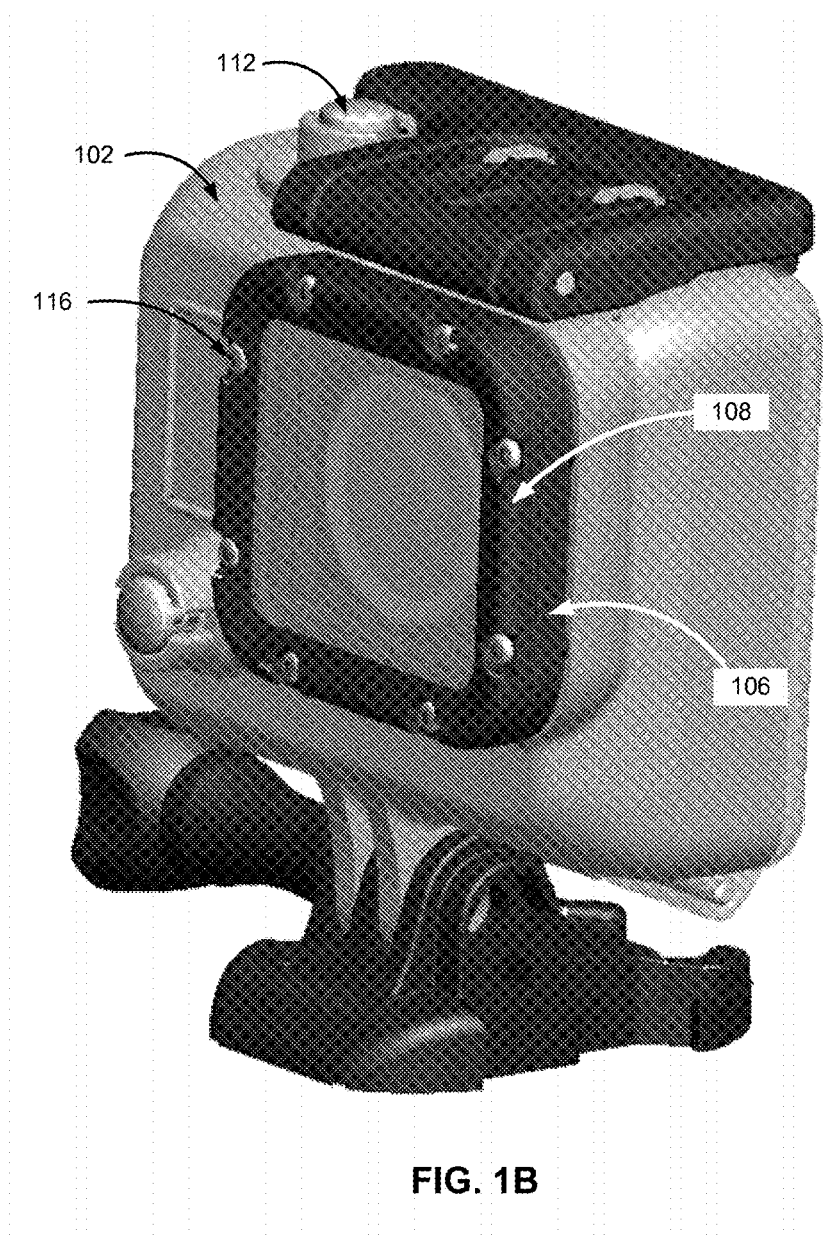
Figure 1C:
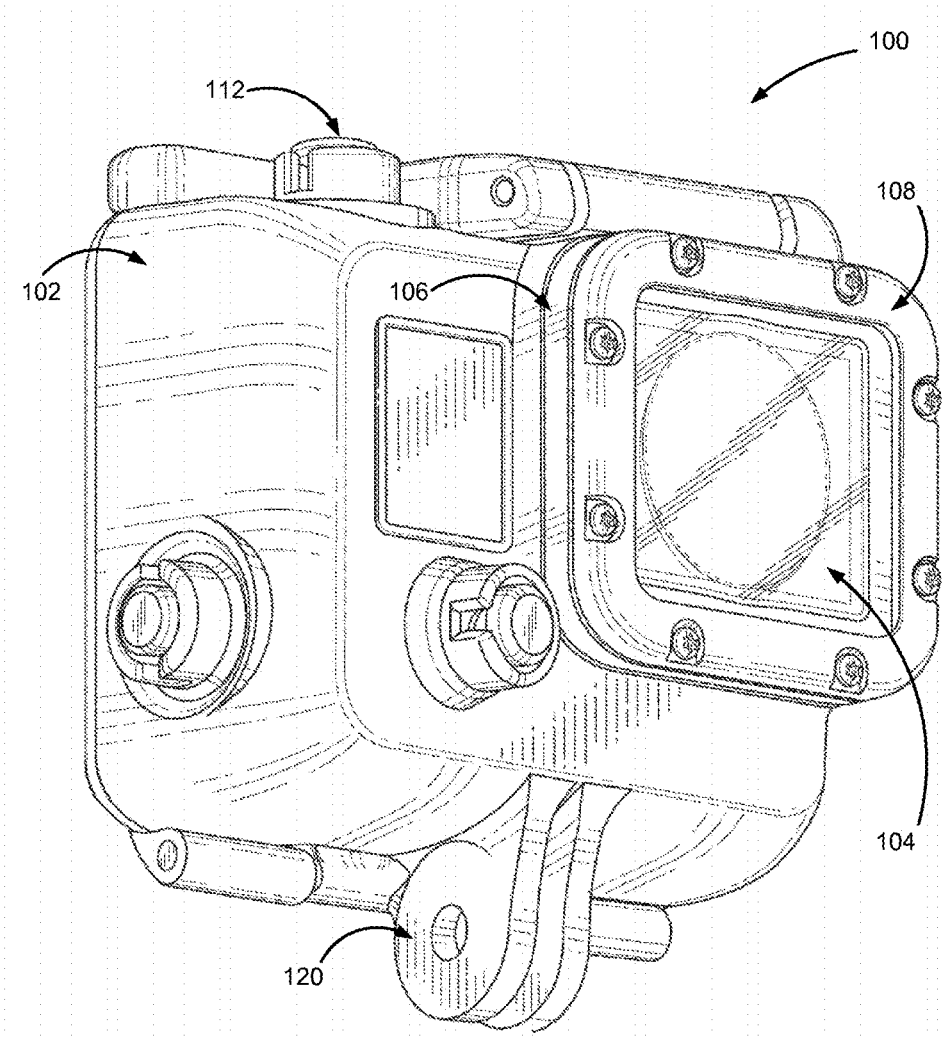

An example camera system includes a camera and external camera housing for enclosing the camera. FIGS. 1A-C illustrate various views of the camera system in accordance with one embodiment. The camera system includes, among other components, a camera housing 100. In one embodiment, a first housing portion 102 includes a front face with four sides (e.g., a top side, bottom side, left side, and right side) structured to form a cavity that receives a camera (e.g., a still camera or video camera).

In one embodiment, the camera housing 100 has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button when the camera is secured within the camera housing 100. The shutter button of the camera is operationally coupled to the outer shutter button 112 so that pressing the outer shutter button 112 allows the user to operate the camera shutter button. In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of external mounting devices. For example, FIGS. 1A and 1B illustrate the camera housing secured to a clip-style mount 122. In other embodiments, the camera housing 100 can be secured to a different type of external mounting structure.

In one embodiment, a thermal conductor 106 is configured to at least partially surround the lens window 104. The thermal conductor 106 comprises a material with a thermal conductivity equal to or higher than the thermal conductivity of the housing 100, such as copper or aluminum. The thermal conductor 106 extends into an interior of the first housing portion 102 and makes contact with a thermally conductive lens ring positioned around the lens of the camera. When the thermal conductor 106 is in contact with the lens ring on the camera, conductive heat transfer may occur between the thermal conductor 106 and the lens ring of the camera.

An insulating plate 108 may be positioned to at least partially cover a front surface of the thermal conductor 106. The insulating plate 108 may comprise a thermally insulating material, such as plastic, and may be affixed to the thermal conductor 106 by one or more screws 116 or any other suitable fastening mechanism. In one embodiment, the insulating plate 108 may protect users of the camera from incidental contact with the thermal conductor 106, which may become hot during use. In one embodiment, the insulating plate 108 may have a larger diameter than the thermal conductor 106, such that the thermal conductor 106 is partially recessed under the insulating plate 108, to further prevent incidental user contact with the conductor ring 106. Thus, in this embodiment, most of the heat is permitted to escape around the perimeter of the thermal conductor 106 instead of through the front face, thereby reducing the likelihood of direct contact from the user.

The described housing 100 may also be adapted for a wider range of devices of varying shapes, sizes and dimensions besides cameras. For example, an expansion module may be attached to housing 100 to add expanded features to electronic devices such as cell phones, music players, PDAs, GPS units, or other portable electronic devices.

Figure 2:
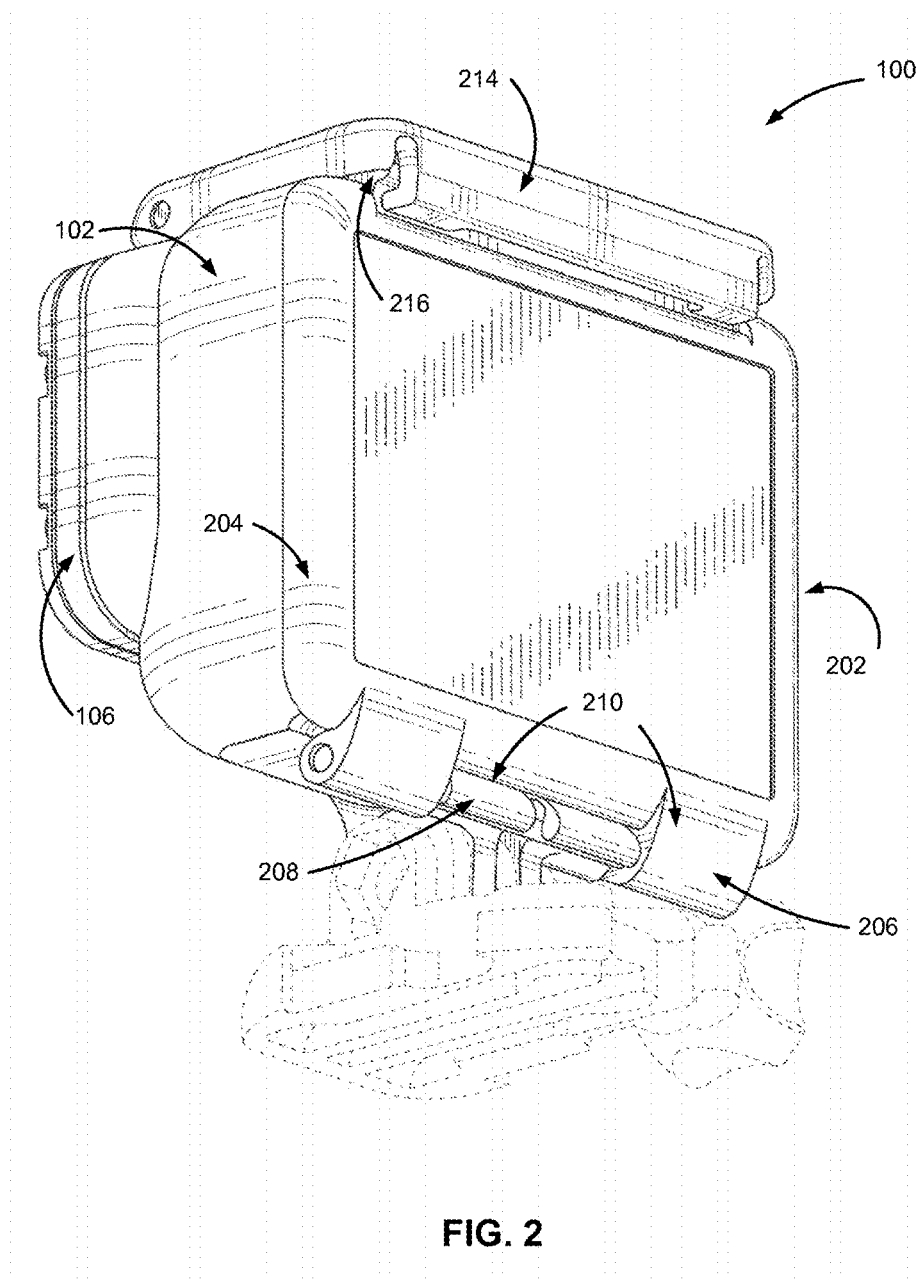
FIG. 2 illustrates a rear perspective view of a rear of the camera mounting assembly, according to one embodiment.

FIG. 2 is a rear perspective view of camera housing 100, illustrating a second housing portion 202. The second housing portion 202 detachably couples with the first housing portion 102 opposite the front face of the first housing portion. The first housing portion 102 and second housing portion 202 are collectively structured to enclose a camera within the cavity when the second housing portion 202 is secured to the first housing portion 102 in a closed position.

In one embodiment, the second housing portion 202 comprises a door 204 that allows the camera to be removed from the housing 100. The door 204 pivots around a hinge 210 that allows the door 204 to be opened or shut. In one embodiment, a first fastening structure 214 located on the top face of the camera housing 100 detachably couples to a second fastening structure 216 on the door 204. The fastening structures 214, 216 secure the door 204 to the first portion 102 of the camera housing 100 in a closed position when coupled, as illustrated in FIG. 2. In one embodiment, the fastening structure 214 comprises a hook-shaped lateral bar and the fastening structure 216 comprises an L-shaped bar. The fastening structure 214 can pivot upwards to allow the door 204 to close and can then be pressed down around the fastening structure 216 to hold the door 204 in the closed position. In different embodiments, fastening structures for securing the door 204 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 210 is instead located on the top face of the housing 100 and the fastening structures 214, 216 are instead located on the bottom face of the housing 100. Alternatively, the hinge 210 and fastening structures 214, 216 may be located on opposite side faces of the camera housing 100.

In one embodiment, the housing 100 includes a watertight seal so that the housing 100 is waterproof when the door 204 is shut. For example, in one embodiment, the door 204 includes a sealing structure positioned on interior edges of the door 204. The sealing structure provides a watertight seal between the first portion of the camera housing 102 and the door 204 when the first securing structure 214 on the top face of the camera housing 100 is coupled to the second securing structure 216 on the top edge of the door 204.

In one embodiment, an outer hinge structure 206 on the bottom edge of the second housing portion 202 detachably couples to an inner hinge structure 208 on the bottom edge of the first housing portion 102 to form the hinge 210. For example, in one embodiment, the outer hinge structure 206 comprises one or more hook-shaped protrusions structured to securely fasten to a rod-shaped member of the inner hinge structure 208. Other mechanisms for coupling the second housing portion 202 to the housing 100 may also be used in various alternative embodiments. In other embodiments, the second housing portion 202 may be permanently attached to the first housing portion 102.

Figure 3:
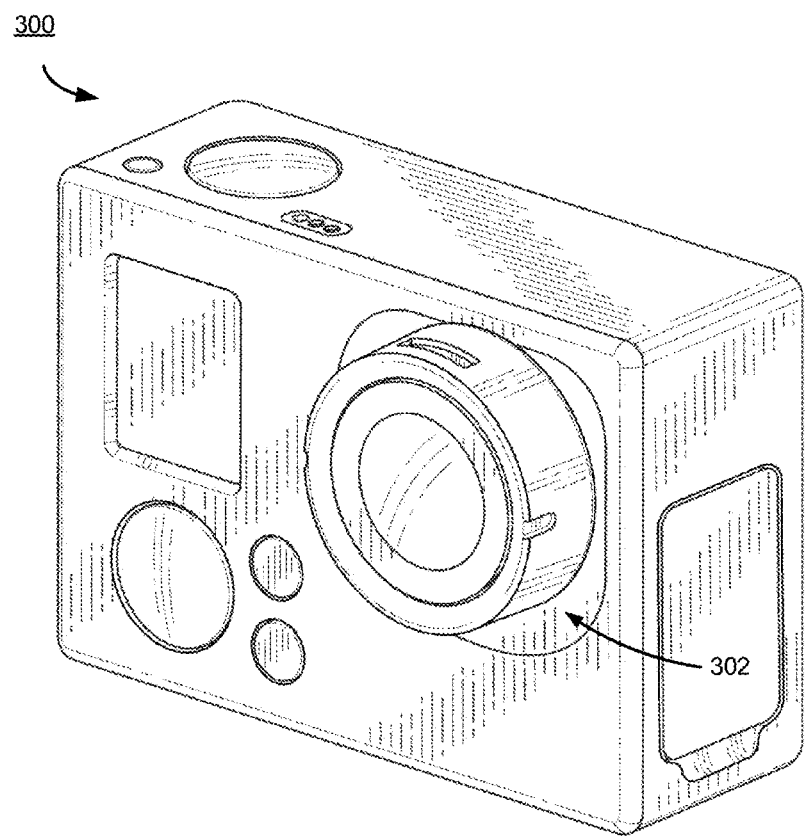
FIG. 3 illustrates a camera for use with the camera mounting assembly, according to one embodiment.

FIG. 3 illustrates an example embodiment of a camera 300 for use with the external camera housing system. The camera 300 is adapted to fit within the enclosure of the external housing 100 discussed above. As illustrated, the camera 300 includes a lens 302. The lens 302 is configured to house an image sensor with the lens behind, for instance, lens glass. The lens may be surrounded by a conductive material thermally coupled to internal electronics of the camera 300 and adapted to dissipate heat produced by the internal electronics. When placed within the housing 100, the lens 302 is inserted within the lens window 104 of the housing 100, and the lens ring can make physical contact with an interior portion of a thermal conductor 106 of the camera housing 100, thereby providing a path for heat to dissipate externally to the housing 100.

Figure 4:
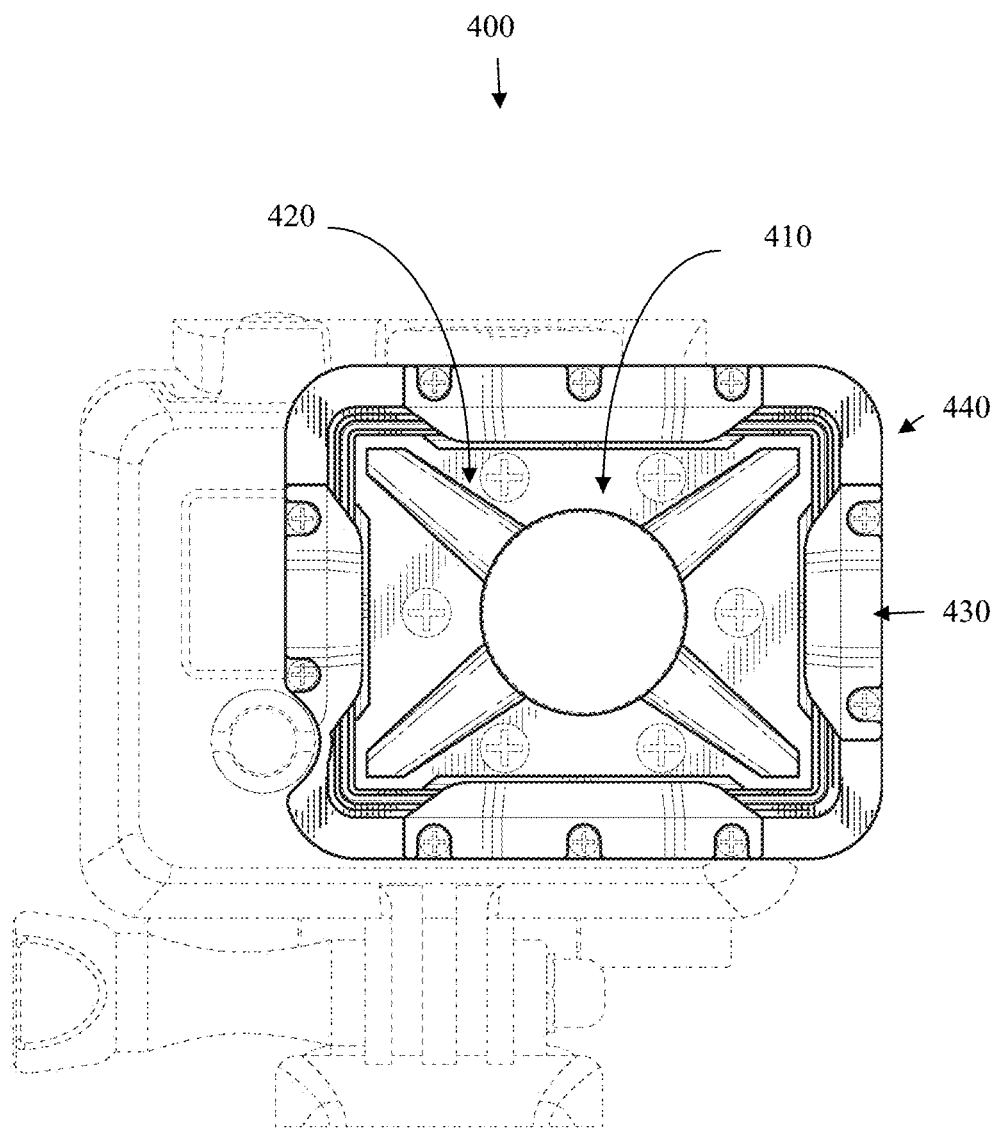
FIG. 4 illustrates an overhead view of a camera mounting assembly configured to optimize the light incident upon an image sensor by using indented sections and recessed channels, according to one embodiment.
Figure 5:
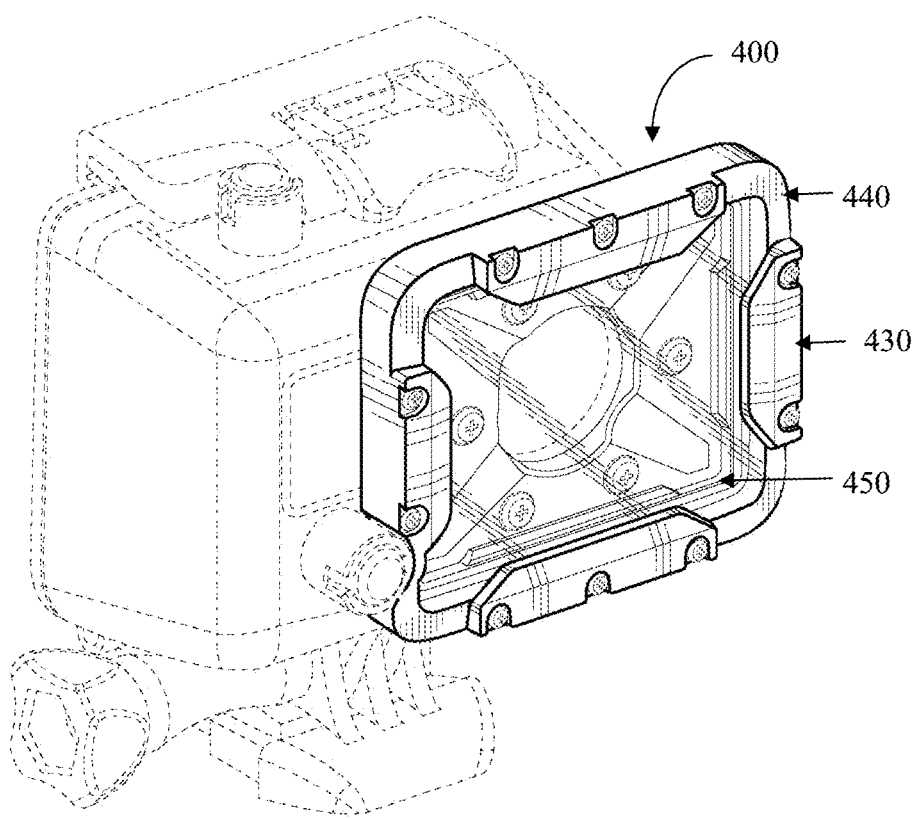
FIG. 5 illustrates a perspective view of a camera mounting assembly configured to optimize the light incident upon an image sensor by using indented sections and recessed channels, according to one embodiment.
Figure 6:
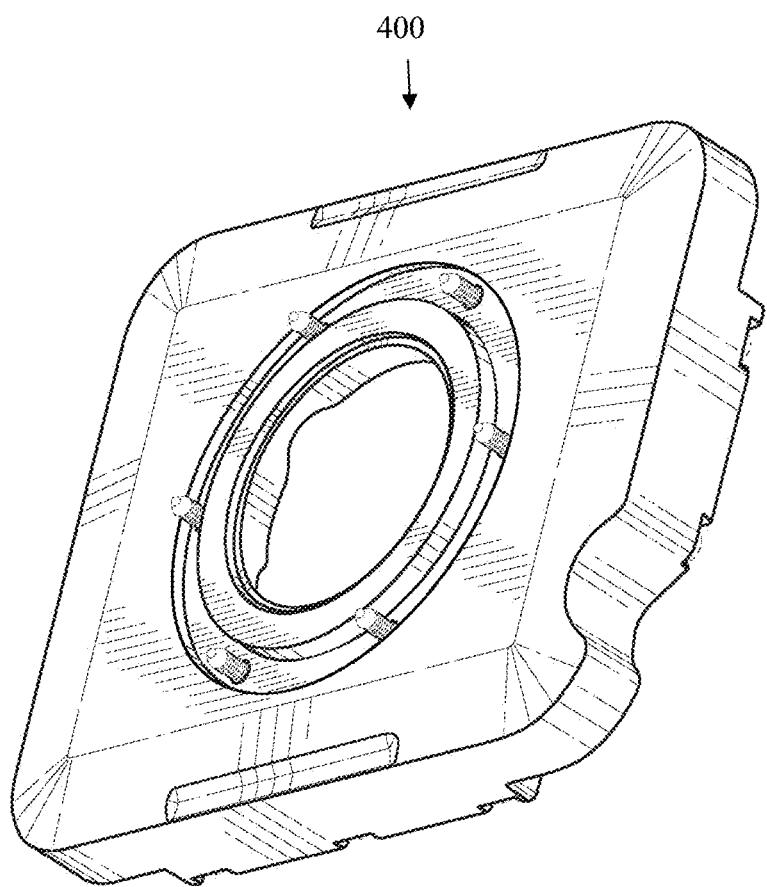
FIG. 6 illustrates a rear perspective view of a camera mounting assembly configured to optimize the light incident on an image sensor by using indented sections and recessed channels, according to one embodiment.

The external camera housing may comprise a camera mounting assembly, as shown in FIGS. 4-6 and described herein. The assembly 400 may be configured to retro-fit existing camera housings, or may be incorporated into new camera housings. Retrofitting the assembly 400 to fit an existing housing may require removing an original lens ring or lens housing (such as the lens window 104) and replacing it with a camera mounting 400 assembly configured to optimize the light incident upon an image sensor. Reference is made herein to a quadrilateral-shaped camera mounting assembly, as shown in FIGS. 4-6, though it should be noted that in other embodiments, camera mounting assemblies of other shapes (such as circular-shaped assemblies, ovular-shaped assemblies, octagonal-shaped assemblies, and the like) may be used according to the principles described herein. The mechanisms used to attach the original lens ring to the housing may beneficially be used to attach a quadrilateral-shaped camera mounting assembly to the housing. For example, a lens ring attached to the housing via a plurality of screws inserted into reciprocal screw holes may be replaced with the quadrilateral-shaped camera mounting assembly, which may be secured to the housing using screws inserted into the same reciprocal screw holes.

The quadrilateral-shaped camera mounting assembly 400 may be square, rectangular, semi-rectangular, or any other four-sided shape in order to accommodate image sensors configured to capture light passing through a rectangular-shaped lens aperture and incident upon the image sensor, resulting in rectangular-shaped digital images representative of the captured light. In the embodiment shown in FIGS. 4-6, the mounting assembly 400 is rectangular. The quadrilateral-shaped camera mounting assembly 400 (or "camera mounting assembly") may include a circular through-hole or opening 410 in the inner-front surface of the assembly which permits the camera mounting assembly 400 to be placed over the top of a circular camera lens or lens securing structure, allowing the circular camera lens to protrude through the back surface of the assembly. In other embodiments, the through-hole or opening 410 in the inner-front surface of the mounting assembly is shaped or otherwise configured to accommodate camera lenses or camera lens securing structures of other shapes.

Traditional camera mounting assemblies block light that would otherwise be incident upon the corners of a rectangular image sensor, preventing the image sensor from capturing such light, and reducing the amount of light information represented in a resulting in a digital image. For example, the corners of such an image may be darkened, blurry, or distorted as a result of light being blocked by a mounting assembly that otherwise would be incident upon and captured by the corners of the image sensor. The camera mounting assembly 400 beneficially includes one or more channels 420 recessed within the inner-front surface of the assembly relative to the inner-front surface of the assembly to allow the corners of the image sensor to receive unobstructed light. In one embodiment, the camera mounting assembly 400 includes a recessed channel 420 extending from a perimeter or edge of the inner-front surface of the mounting assembly toward the center of the inner-front surface of the assembly. For instance, each channel can extend toward a through-hole 410 in the assembly for accommodating a camera lens or camera lens securing structure. The width, depth, and length of the recessed channels 420 may be configured according to the dimensions of the camera (element 300 in FIG. 3), camera lens, the camera lens securing structure, the image sensor, and/or the camera mounting assembly 400. In one embodiment, the dimensions of the inner-front surface of the camera mounting 400 assembly are substantially proportional to the dimensions of the images captured by the image sensor.

The camera mounting assembly 400 may include four sides 430 coupled to the inner-front surface of the assembly and protruding from the inner-front surface of the assembly: a top side, a left side, a bottom side, and a right side. The sides collectively form an assembly perimeter protruding from and relative to the inner-front surface of the assembly. The perimeter may include indented sections 440 of reduced height, width, or volume to maximize light flow to the corners of the image sensor. In other words, the corners formed by the intersection of any two adjacent sides may be indented relative to the protruding distance or height of the sides 430 from the inner-front surface of the assembly, forming a top-left indentation, a top-right indentation, a bottom-left indentation, and a bottom-right indentation. In embodiments in which the mounting assembly is circular, the mounting assembly can include a circular perimeter coupled to the inner-front surface of the camera assembly and protruding out from the inner-front surface of the camera assembly. In these embodiments, the circular edge can include indentations substantially aligned with the corners of the image sensor of a camera coupled to the mounting assembly. In one embodiment, the recessed channels 420 substantially align with the indentations 440. The assembly 400 may have various other combinations of indentations 440 and/or recessed channels 420.

As displayed in the embodiment of FIG. 5, the camera mounting assembly 400 can include a front panel 450 made of glass, or any other transparent, partially transparent, or optical material. The front panel 450 can be coupled to the mounting assembly 400 and held in place by the sides 430 of the mounting assembly 400. The sides 430 of the mounting assembly can secure the front panel 450 by protruding over the top surface of the front panel 450 towards the center of the front panel 450. In one embodiment, the front panel 450 is securely coupled to the assembly 400 so that a watertight seal is formed between the front panel 450 and the body of the assembly 400. In addition, the assembly 400 can form a watertight seal with the camera housing, allowing for the underwater operation of a camera within the housing coupled to the assembly 400. In one embodiment, the top surface of the sides of the assembly 400 at the indentation 440 forms a substantially smooth surface with the front panel 450. FIG. 6 illustrates a rear perspective view of the camera mounting assembly 400 as described in FIGS. 4 and 5.

Figure 7:
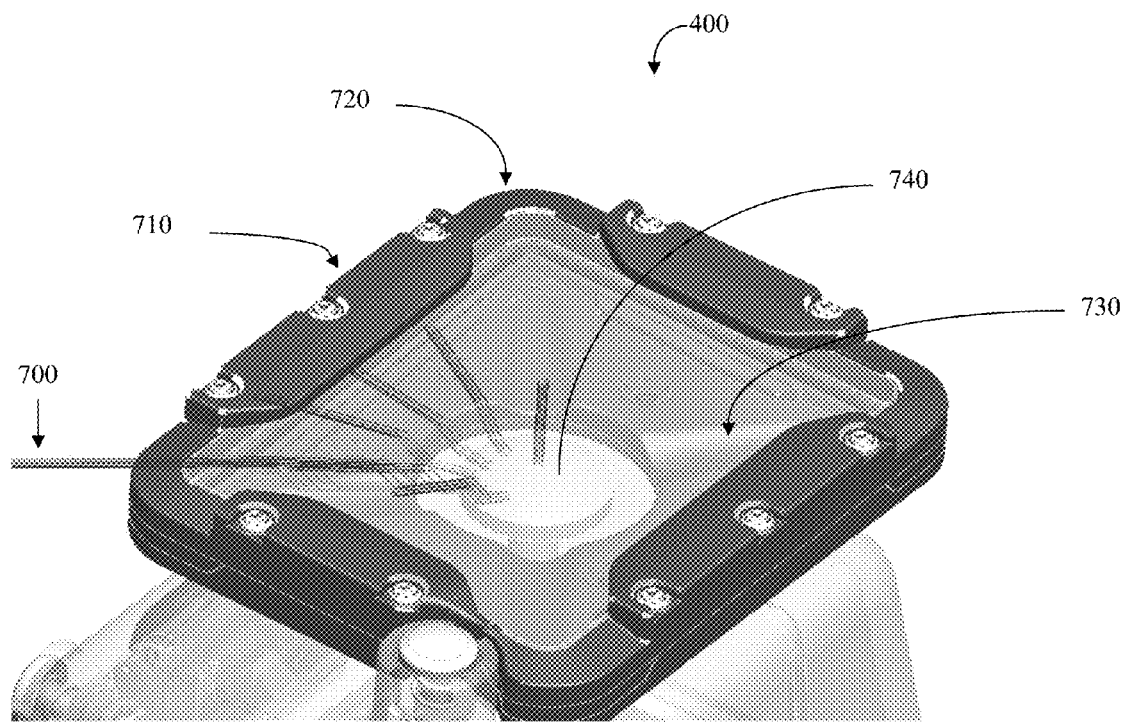
FIG. 7 illustrates the path of light rays over the inner-front surface of the camera mounting assembly through the circular hole in the inner-front surface of the assembly and incident upon a camera's image sensor, according to one embodiment.
Figure 8:
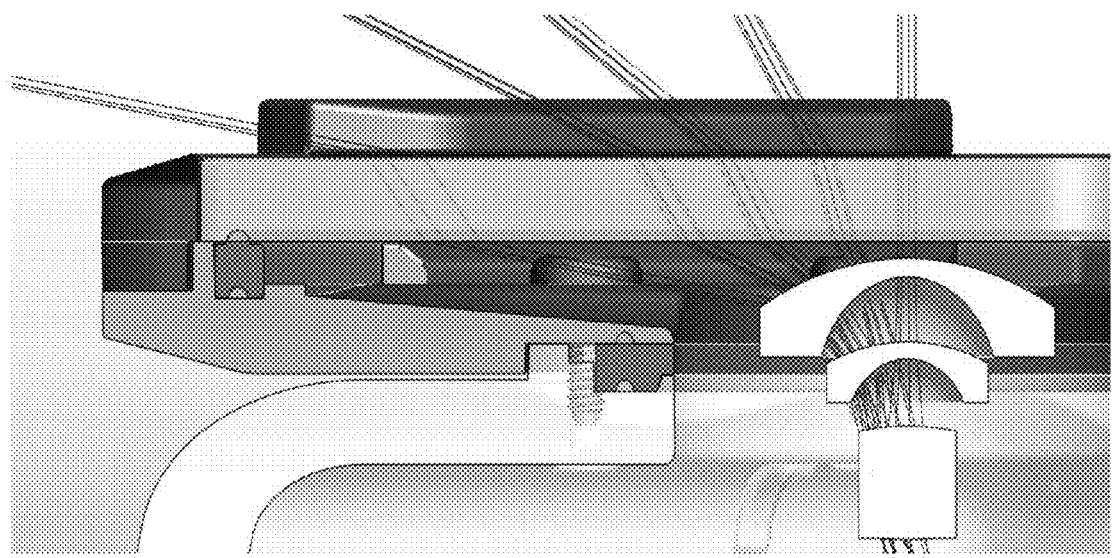
FIG. 8 illustrates another view of the path of light rays over the inner-front surface of the camera mounting assembly through the circular hole in the inner-front surface of the assembly and incident upon a camera's image sensor, according to one embodiment.

FIGS. 7 and 8 display the passage of light 700 from the indented sections 720 in the sides 710 of a rectangular camera mounting assembly 400 through the recessed channels 730 and incident upon a camera's image sensor 740. Unlike with traditional camera mounted assemblies, the indented sections 720, formed at the intersection of two adjacent sides 710, allow light rays 700 to pass unobstructed, and permit the camera image sensor to capture optimal light information with the corners of a rectangular image sensor 740. The addition of recessed channels 730 into the inner-front surface of the assembly 400 also increases the amount of light information available to the corners of the image sensor 740.

Figure 9:
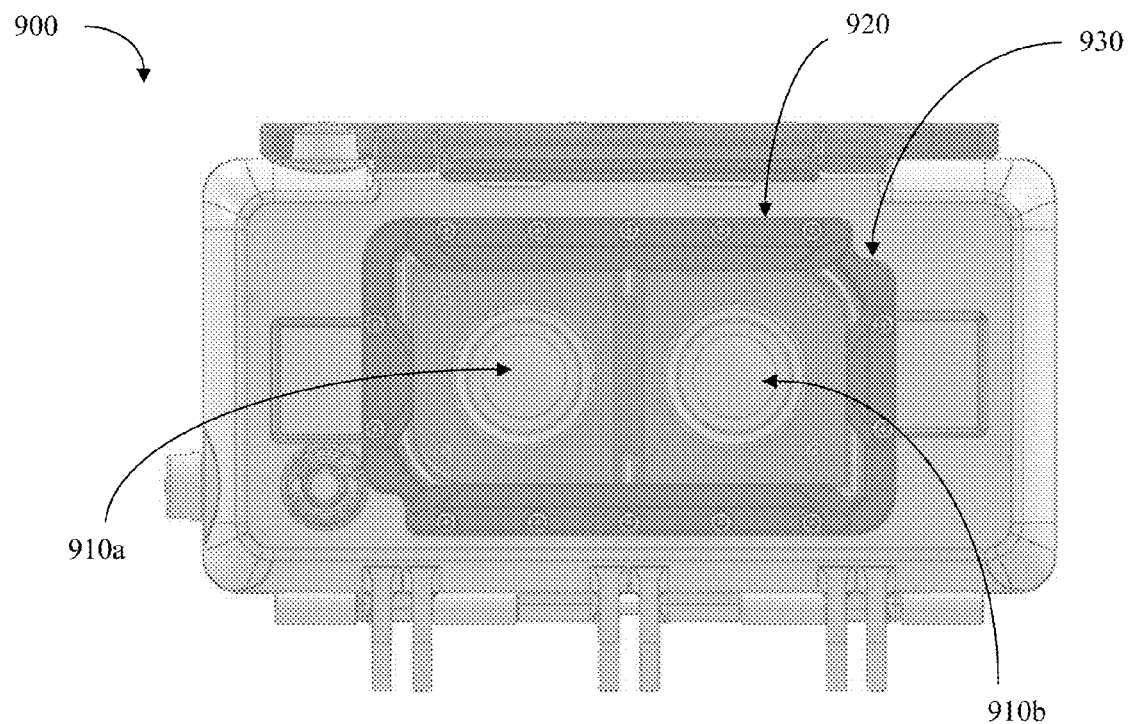
FIG. 9 illustrates a view of a camera mounting assembly configured to accommodate two camera lenses and associated image sensors via separate circular holes in the inner-front surface of the assembly and to optimize the light incident upon the image sensors by using indented sections, according to one embodiment.
Figure 10:
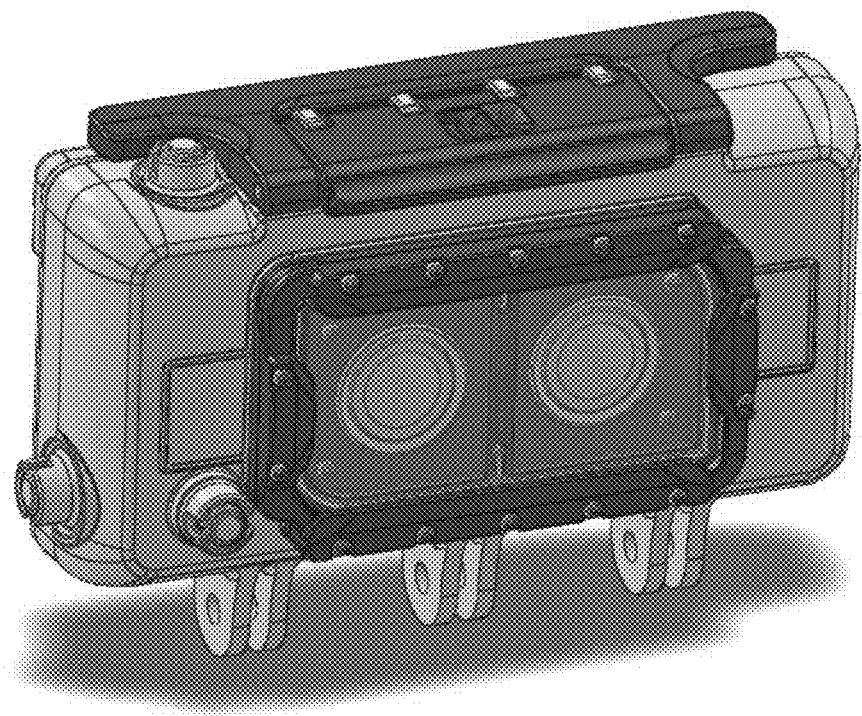
FIG. 10 illustrates another view of the camera mounting assembly configured to accommodate two camera lenses and associated image sensors via separate circular holes in the inner-front surface of the assembly and to optimize the light incident upon the image sensors by using indented sections, according to one embodiment.
Figure 11:
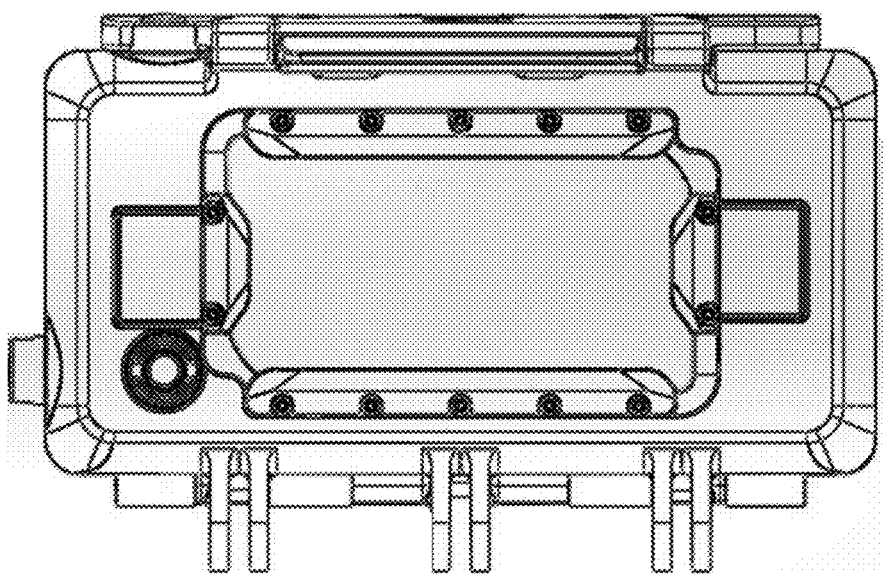
FIG. 11 illustrates another view of the camera mounting assembly configured to accommodate the passage of light to multiple cameras via the inner-front surface of the assembly according to one embodiment.

The camera mounting assembly may be configured to accommodate more than one camera, as displayed in FIGS. 9-11. The multi-camera mounting assembly illustrated in FIGS. 9-11 is configured for 3-dimensional ("3D") video capture requiring simultaneous image acquisition from two cameras. If one camera, positioned upside down, is placed beside a second camera, the camera mounting assembly 900 may be configured to accommodate two, circular camera lenses and may comprise a wider inner-front surface with two holes or openings, a left opening 910a and a right opening 910b (collectively, "openings 910"), for accommodating the two camera lenses. In such an embodiment, the camera assembly 900 can include four recessed channels within the inner-front surface of the mounting assembly (not illustrated in the embodiments of FIGS. 9-11), such that two recessed channels run from the outer edge of each lens hole to a respective corner of the inner-front surface of the mounting assembly associated with each lens hold. It should be noted that in other embodiments, the mounting assembly described in FIGS. 9-11 can accommodate two cameras inserted into a housing right-side up. Alternative embodiments can allow cameras to be vertically stacked, and can be configured to allow for multi-camera image capture (as opposed to 3D image capture).

Continuing with this embodiment, the camera mounting assembly can include four protruding sides 920 coupled to the inner-front surface of the assembly, and can include an indentation 930 at each corner formed by adjacent sides 920. For example, a top-left and bottom-left corner of the mounting assembly sides can be indented to prevent the obstruction of light incident upon the top-left corner and the bottom-left corner, respectively, of an image sensor of a left camera lens protruding through the left opening 910a, and a top-right and bottom-right corner of the mounting assembly sides can be indented to prevent the obstruction of light incident upon the top-right corner and bottom-right corner, respectively, of an image sensor of a right camera lens protruding through the right opening 910b. FIG. 10 shows a perspective view of the camera mounting assembly of FIG. 9, and FIG. 11 shows a line-drawing overhead view of the camera mounting assembly of FIG. 9.

It should be noted that although the mounting assembly is described as a separate component configured to couple to a camera or camera housing, the principles described herein may equally apply directly to a camera body itself. For example, the indentations and/or recessed channels, and described herein, may be incorporated into a camera body, for instance in a lens ring or front camera surface. In such embodiments, the camera itself may be waterproof, allowing for use underwater.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. The term variation is used interchangeably with embodiment.

Some embodiments may be described using the expressions "coupled", "paired", and "connected" along with their derivatives. For example, some embodiments may be described using the term "coupled" to indicate that two or more elements are in direct physical or electrical contact. The terms "coupled" and "paired," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a modular configurable camera system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope.

What is claimed is:

1. A camera mounting assembly comprising:
   an attachment mechanism configured to attach the camera mounting assembly around a lens of a camera comprising an image sensor;
   a perimeter wall protruding a first distance from an inner-front surface of the camera mounting assembly, the perimeter wall comprising a plurality of indentations each protruding a second distance less than the first distance from the inner-front surface, each indentation corresponding to a corner of the image sensor; and
   one or more recessed channels within the inner-front surface of the camera mounting assembly, each recessed channel corresponding to one of the plurality of indentations thereby forming an unobstructed path from a corner of the image sensor through the recessed channel and through the indentation.

2. The camera mounting assembly of claim 1, wherein the camera mounting assembly is rectangular.

3. The camera mounting assembly of claim 1, wherein the camera mounting assembly is a square.

4. The camera mounting assembly of claim 1, wherein each recessed channel extends outward from a center of the camera mounting assembly towards and substantially aligned with the corresponding indentation.

5. The camera mounting assembly of claim 1, further comprising:
   a cover lens secured to the perimeter wall thereby creating a water proof seal between the attachment mechanism and the lens of the camera.

6. The camera mounting assembly of claim 5, wherein a distance between the cover lens and the inner-front surface of the camera mounting assembly is equal to or less than the second distance.

7. A camera mounting assembly comprising:
   an inner-front surface comprising an opening configured to allow for the insertion of a reciprocal camera lens;
   a perimeter wall protruding a first distance from the inner-front surface of the camera mounting assembly, the perimeter wall comprising at least one indentation within the wall each protruding a second distance less than the first distance from the inner-front surface; and
   at least one recessed channel within the inner-front surface of the camera mounting assembly corresponding to one of the at least one indentations, thereby forming an unobstructed path from a corner of the image sensor through the recessed channel and through the indentation.

8. The camera mounting assembly of claim 7, wherein the camera mounting assembly is rectangular.

9. The camera mounting assembly of claim 7, wherein the camera mounting assembly is a square.

10. The camera mounting assembly of claim 7, wherein each recessed channel extends outward from the opening of the inner-front surface of the camera mounting assembly towards and substantially aligned with the corresponding indentation.

11. The camera mounting assembly of claim 7, further comprising:
    a cover lens secured to the perimeter wall thereby creating a water proof seal between the camera mounting assembly and the lens of the camera.

12. The camera mounting assembly of claim 11, wherein a distance between the cover lens and the inner-front surface of the camera mounting assembly is equal to or less than the second distance.

13. A camera mounting assembly comprising:
an inner-front surface comprising an opening configured to allow for the insertion of a reciprocal camera lens;
a perimeter wall protruding a first distance from the inner-front surface of the camera mounting assembly, the perimeter wall comprising a plurality of indentations within the wall each protruding a second distance less than the first distance from the inner-front surface;
a cover lens secured to the perimeter wall such that a distance between the cover lens and the inner-front surface of the camera mounting assembly is equal to or less than the second distance; and
a first plurality of portions and a second plurality of portions of the camera mounting assembly surrounding the opening, each of the first plurality of portions surrounded by one or more of the second plurality of portions such that a distance between each of the first plurality of portions and the cover lens is less than a distance between each of the second plurality of portions and the cover lens.

14. The camera mounting assembly of claim 13, wherein the camera mounting assembly is rectangular.

15. The camera mounting assembly of claim 13, wherein the camera mounting assembly is a square.

16. The camera mounting assembly of claim 13, wherein each indentation corresponds to and is at least partially aligned with at least one of the second plurality of portions.

17. The camera mounting assembly of claim 13, wherein the cover lens forms a waterproof seal between the camera mounting assembly and the camera lens,
a cover lens secured to the perimeter wall thereby creating a water proof seal between the attachment mechanism and the lens of the camera.

18. A camera mounting assembly configured for attachment to a camera and comprising a front surface and a side surface protruding from the front surface, the side surface including a divot, the front surface comprising a recessed channel such that light can pass unobstructed through the divot and the recessed channel and be incident upon a corner of an image sensor of the camera.

19. The camera mounting assembly of claim 18, wherein the camera mounting assembly is rectangular or square.

20. The camera mounting assembly of claim 18, further comprising a cover lens secured to the side surface such that a distance between the cover lens and the front surface is equal or less than a distance between a surface of the divot and the front surface.

* * * * *